United States Patent [19]

Uematsu

[11] Patent Number: 4,529,285
[45] Date of Patent: Jul. 16, 1985

[54] LIGHT-INTERCEPTING BLADE FOR A LIGHT CONTROL DEVICE

[75] Inventor: Kimio Uematsu, Tokyo, Japan

[73] Assignee: Nippon Kogaku K. K., Tokyo, Japan

[21] Appl. No.: 582,635

[22] Filed: Feb. 22, 1984

[30] Foreign Application Priority Data

Feb. 28, 1983 [JP] Japan .................................. 58-26995

[51] Int. Cl.³ ............................................... G03B 9/40
[52] U.S. Cl. ...................................... 354/246; 354/249
[58] Field of Search ............................... 354/241–250, 354/261, 264, 270, 271.1, 274

[56] References Cited

U.S. PATENT DOCUMENTS 4,298,265 11/1981 Tanaka et al. ....................... 354/249
4,401,380 8/1983 Sato et al. ........................... 354/246
4,486,084 12/1984 Sato et al. ........................... 354/246

Primary Examiner—A. A. Mathews
Attorney, Agent, or Firm—Shapiro and Shapiro

[57] ABSTRACT

A light intercepting blade for a light control device is constructed with guide members including a pair of wall surfaces and disposed outside the optical path with a plane intersecting the light path being positioned between the wall surfaces; a planar light intercepting blade member disposed on the plane and intersecting the light path, with one end thereof being positioned in a space gap between the pair of wall surfaces; and drive device holding the other end of the light intercepting blade member opposite to the one end thereof with respect to the light path, and for moving the light intercepting blade member in the direction of the plane so as to cause the one end of the blade to slide in and through the space gap between the pair of wall surfaces.

3 Claims, 5 Drawing Figures

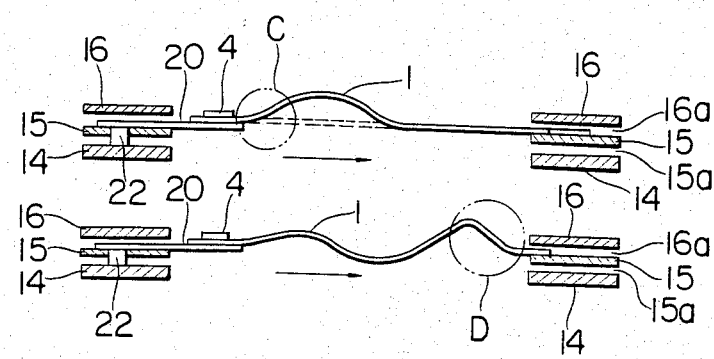
FIG. 1A
FIG. 1B
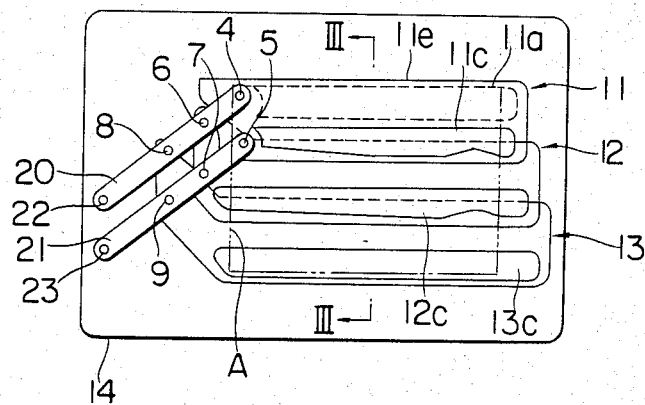
FIG. 2
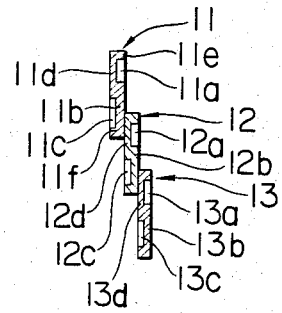
FIG. 3
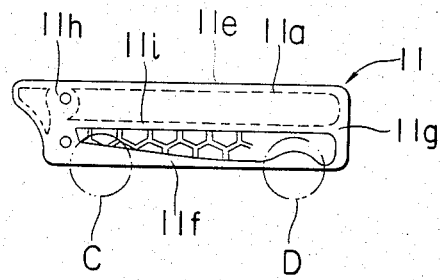
FIG. 4

LIGHT-INTERCEPTING BLADE FOR A LIGHT CONTROL DEVICE

BACKGROUND OF THE INVENTION

1. Field of the Invention

This invention relates to a light control device. More particularly, it is concerned with a light control device such as a shutter or an automatic diaphragm which performs full closure of an aperture, through which light passes, or reduction in the degree of opening of the aperture by mechanical means such as a plurality of light-intercepting blades, and especially with the structure of each of the light-intercepting blades forming such light control device.

2. Description of the Prior Arts

The light-intercepting blade used in a mechanical light control device such as a shutter or an automatic diaphragm is constructed with a plurality of blades made of metal or plastic plates. By enabling this light-intercepting blade to move at a high speed, a shorter exposure time can be obtained with improved accuracy in still cameras. On the other hand, reduction inforce to be exerted for driving the shutter of the automatic diaphragm leads to an advantage such that the film wind-up operation in the camera is made lighter, thereby improving durability of the shutter or the diaphragm. In order to reduce such drive force and moreover move the light-intercepting blade at a high speed, it is necessary that the mass of the blade itself be reduced. U.S. Pat. No. 4,401,380 of the same applicants as the present invention proposes a light-intercepting blade with its one or both surfaces having been subjected to the so-called "thinning" process, by which thickness of a portion of the blade other than the marginal portion thereof is reduced.

However, the light-intercepting blade manufactured in this manner has its component blades usually formed of thin plates, and such process of making the thickness of the individual blade much thinner in part would unavoidably result in decreased blade strength. Particularly, at the termination of movement of the shutter blades, brake is applied in a very short range, which makes the impact applied to the blades themselves to be very great. In the case of a square focal plane shutter, wherein each of the forward blade group and the rearward blade group comprises several blades, brake is applied not by directly receiving the blades to stop them, but often by stopping the blade driving member (blade arm), hence the largest impact is applied to the blades at the root of the blades (the neighborhood of the joined portion between the blade arm and the blades) where the inertia of the entire blades acts, and flexure or bending may be caused in that portion.

Partial thinning of the individual shutter blades is effective in weight reduction of the blades, while it involves the disadvantages as mentioned above. Therefore, simple reduction in weight of the blades does not always insure higher moving speed of the blades.

As a way of solving the conventional problems as mentioned in the foregoing, the present inventor proposed an improvement as described in U.S. patent application Ser. No. 460,925 filed on Jan. 25, 1983, by which it has become possible to maintain sufficient strength at the root of the light-intercepting blades. After this improvement made, he continued further studies on the manufacture of more ideal light-intercepting blade, in the course of which he discovered that, with reduction in weight, a problem of the blade strength occurs even at or near the free end of the light-intercepting blade away from the joined portion between the blade and the blade arm, and that this new problem could not be solved by the abovementioned improved technique.

SUMMARY OF THE INVENTION

It is an object of the present invention to provide a light-intercepting blade which has been made lighter in weight without sacrificing the strength thereof sufficient to be able to withstand high-speed movement.

It is another object of the present invention to provide an improved light-intercepting blade having sufficient strength over the entire region thereof.

It is further object of the present invention to provide a light-intercepting blade with increased rigidity at the stress-concentrating portion of the blade in the vicinity of the free end thereof so as to reduce the elastic deformation to occur at this end portion.

BRIEF DESCRIPTION OF THE DRAWINGS

FIGS. 1A and 1B are longitudinal cross-sectional views showing deformations occurred in the light-intercepting blade;

FIG. 2 is a front view of one embodiment of a focal plane shutter device according to the present invention;

FIG. 3 is a cross-sectional view of the shutter device shown in FIG. 2, taken along a line III—III; and FIG. 4 is a front view of a piece of the shutter blade shown in FIG. 2.

DESCRIPTION OF THE PREFERRED EMBODIMENTS

For good understanding of the problem in strength of the light-intercepting blade to occur at or near the free end thereof, explanations will be given hereinbelow as to the state of deformation to take place in a weight-reduced shutter blade at the instant of terminating its travelling.

FIGS. 1A and 1B illustrate one blade of a group of the shutter blades constituting the trailing curtain of the focal plane shutter and a mechanism relating to this blade. In the drawing, a partition plate 15 and a cover plate 16 are fixedly secured on a shutter base plate 14 by unshown members with clearances 15a and 16a being formed between one another. A shaft 22 is pivotally held on the shutter base plate 14 to axially support an arm 20 through an opening (not shown) formed in the partition plate 15. The blade 1 has a thinning portion (not shown) in one or both side surfaces thereof. The blade is rotatably supported at its one end on the blade arm 20 with a pin 4, and its free end is inserted into the space gap 16a. The partition plate 15 and the cover plate 16, both defining the space gap 16a, constitute guide members for securing stable travelling of the blade group of the trailing curtain. In the same manner, the shutter base plate 14 and the partition plate 15, both defining the space gap 15a, constitute guide members for the blade group of the leading curtain.

When the blade arm 20 is driven, the blade travels from top to bottom (on the surface of the drawing sheet), or vice versa. As soon as the blade covers the exposure aperture and the blade arm 20 stops its movement, hence stoppage in travelling of the blade 1, it brings about buckling in the direction of its plane due to impact applied thereto, whereby flexure or bending takes place at or near a portion (designated by "C" in FIG. 1A) of the blade where it is axially supported with the pin 4, and the blade is elastically deformed. This flexure occurred in the blade due to its elastic deformation propagates in the form of waves toward the free end thereof (i.e., in the arrow direction) with lapse of time. FIG. 1B shows this state. In order to eliminate a clearance between the adjacent blades and to insure good light-interception, the free end of the blade 1 is held between the guide members 15 and 16 to such an extent that their up-and-down travelling may not be hindered. On account of such construction, the propagating wave reaching the free end of the blade is deprived of its degree of freedom and its curvature becomes abruptly reduced. The position where the propagating wave reduces its curvature to the minimum is always fixed at one and the same place; it is in the vicinity of the free end of the blade where the curvature of the wave becomes minimum immediately before the quantity of deformation of the blade being restricted by the guide members 15, 16. This position is indicated as "D" in FIG. 1B. The portion of the minimum curvature causes a great internal stress for the degree of bending, which tends to bring about breakage such as cracks, ruptures, etc. after repeated travelling of the shutter blade.

FIG. 2 illustrates a preferred embodiment of the focal plane shutter device utilizing the improved light-intercepting blade according to the present invention. While the square focal plane shutter comprises the leading and trailing curtains as mentioned in the foregoing, both curtains are substantially same in construction, hence the drawing illustrates the trailing curtain alone, omitting the leading curtain from illustration. As seen from the drawing in FIG. 2, one end of each of the first blade (a slit forming blade) 11, the second blade 12, and the third blade 13 is rotatably supported on a pair of arms 20, 21 by means of respective pair of pins 4 and 5; 6 and 7; 8 and 9. These arms 20, 21 are rotatably mounted on the shutter base plate 14 through respective shafts 22, 23. Since the pins 4, 5 and the shafts 22, 23 are so arranged that they may form a parallelogram, four-bar linkage of the parallelogram is formed with the first blade 11, the arms 20, 21, and the shutter base plate 14. Accordingly, the first blade 11, the second blade 12, and the third blade 13 perform the parallel movement in the up-and-down direction in the drawing in accordance with oscillating movement of the arms 20, 21 with the respective shafts 22, 23 as the center of their oscillation. However, since the moving quantity of each shutter blade during its travelling is governed by a length of the arm 20 between the shaft 22 and each of the pins 4, 6 and 8, the moving quantity of the first blade 11 is larger than that of the second blade 12, and the moving quantity of the second blade is greater than that of the third blade 13. Same as illustrated in FIG. 1 above, these blades 11, 12, and 13 are disposed in the space gap 16a between the partition plate 15 and the cover plate 16. The leading curtain (not shown in the drawing) of the focal plane shutter device is disposed in the space gap 15a shown in FIGS. 1A and 1B.

As shown in FIG. 3, the first blade 11 has on its one surface side a recessed portion 11a and a flat surface portion 11b. It also has on its other surface side a recessed portion 11c and a flat surface portion 11d. The recessed portions 11a and 11c are so formed that they may be positioned on the rear side of the respective flat surface portions 11d and 11b. In the same manner, the second blade 12 and the third blade 13 have on both surface sides thereof recessed portions 12a, 12c and 13a, 13c formed on the rear sides of the respective flat surface portions 12d, 12b and 13d, 13b. Of these recessed portions, the portions 11a, 12a, 13a, and 13c are formed with a substantially uniform width from neighborhood of the root of the blade to its free end. On the other hand, the recessed portions 11c and 12c of the blades 11 and 12 are formed in such a manner that their width becomes gradually broad as they are distant from the root of the blades where they are held by the drive arms 20, 21 toward their free ends. In addition, in the vicinity of the free end of the blades 11 and 12, i.e., in the front portion thereof where the distal end of the blade enters into the sapce gap 16a, the recessed portions 11c and 12c each has a partially narrowed width.

The light-intercepting blade according to the present invention is made of a material selected from titanium plate, aluminum alloy plate, and other metal plates, or polyester film and other plastic plates. The recessed portion may be formed by partial etching of the base plate with chemicals, or by adhering a reinforcing thin film of the same or different material as or from that of the base plate on the peripheral region of the base plate.

FIG. 4 illustrates the first blade 11 alone as taken out of the rear curtain of the focal plane shutter device. In this blade, the peripheral parts 11e, 11f, and 11g including the root portion 11h to be connected with the blade arm as well as a portion 11i between the recessed portion 11a and the recessed portion 11c are formed in thick gauge. At positions in the vicinity of the root of the blade (the portion C) and in the vicinity of the end part of the exposure aperture A near the free end of the blade (the portion D), the width of the region formed in thick gauge is particularly broad. The second blade 12 is somewhat different in construction from the first blade 11 in respect of the contour end the positions of the pins 6, 7, remainder of which are same as the first blade 11, hence explanations of these identical parts will be dispensed with. In the developed state of the blades as shown in FIG. 2, the flat surface portion 11b of the first blade 11 and the flat surface portion 12d of the second blade 12 are overlapped in the direction of the light path passing through the aperture to be in mutual contact. Further, the flat surface portion 13d of the third blade 13 and the flat surface portion 12b of the second blade are also overlapped to be in mutual contact. These states are clearly shown in FIG. 3.

Each of the blades thus constructed is light in weight, and, in particular, it has the augmented rigidity at the root portion where the maximum impact force is generated when the travelling of the blade across the aperture is abruptly stopped, and at a portion immediately before the free end thereof held between the pair of the guide members 15 and 16. On account of this, the elastic deformation to be generated at the root portion of the blade is small, and, further, even if this elastic deformation is propagated toward the free end, there is no possibility of the curvature of the propagating wave becoming small just in front of the free end of the blade, hence no fatigue can be accumulated easily in the blade itself, and the blade is not liable to breakage in its use over a long period of time.

Incidentally, of the blade 11, 12 and 13, the first blade 11 with the largest moving quantity receives the greatest impact force, which becomes gradually small with the second blade 12 and the third blade 13 in sequence. On account of this, only the first and second blades alone in this embodiment are given the reinforcing measures as mentioned above.

In addition, as illustrated partially in FIG. 4, the recessed portion in each blade may be combination of a plurality of recesses as taught in the afore-mentioned U.S. Pat. No. 4,401,380.

What is claimed is:

1. A device for controlling light passing through a light path in an optical apparatus, which comprises:
    (a) guide members including a pair of wall surfaces, and disposed outside said optical path with a plane intersecting said light path being positioned between said wall surfaces;
    (b) a planar light intercepting blade member disposed on said plane and intersecting said light path, with one end thereof being positioned in a space gap between said pair of wall surfaces; and
    (c) drive means holding the other end of said light intercepting blade member opposite to said one end thereof with respect to said light path, and for moving said light intercepting blade member in the direction of the plane so as to cause said one end of the blade to slide in and through the space gap between said pair of wall surfaces, said light-intercepting blade member having a connecting portion to be connected with said drive means, and the distributed characteristics of the mechanical strength thereof being so determined that the rigidity gradually decreases from said connecting portion toward said one end, and the rigidity increases again at a portion adjacent to said pair of wall surfaces inside said light path.

2. The device as set forth in claim 1, wherein said light intercepting blade member comprises a surrounding region including said connecting portion and having a substantially constant thickness in the direction along said light path, and an inside region defined by said surrounding region and having a thickness thinner than said constant thickness, wherein said distributed characteristics of the mechanical strength is given by varying a ratio of a width of said surrounding region in said light intercepting blade member with respect to its moving direction to a width of said light intercepting blade member with respect to said moving direction thereof.

3. The device as set forth in claim 2, wherein said inside region is constructed with a recess formed in at least one surface side of said light intercepting member.

* * * * *